United States Patent [19]
Tamura et al.

[11] Patent Number: 4,583,102
[45] Date of Patent: Apr. 15, 1986

[54] OPTICAL DISC AND METHOD OF MANUFACTURING

[75] Inventors: Tooru Tamura, Ikeda; Kensuke Kuchiba, Hirakata; Akio Itoh, Katano; Masaaki Sunohara, Hirakata; Shunsuke Matsuda, Osaka, all of Japan

[73] Assignee: Matsushita Electric Industrial Co., Ltd., Osaka, Japan

[21] Appl. No.: 606,461

[22] Filed: May 3, 1984

[30] Foreign Application Priority Data

May 4, 1983 [JP] Japan .................................. 58-78494
Jun. 6, 1983 [JP] Japan ................................. 58-101120

[51] Int. Cl.⁴ .................... G01D 9/00; B05D 5/06;
B32B 27/06; G03C 1/00
[52] U.S. Cl. .................... 346/135.1; 346/137;
427/162; 427/402; 427/407.1; 428/913;
430/495; 430/945
[58] Field of Search ............. 346/135.1, 137;
427/162, 402, 407.1; 428/913; 430/495, 945

[56] References Cited
U.S. PATENT DOCUMENTS

| | | | |
|---|---|---|---|
| 4,268,840 | 5/1981 | Schank et al. | 346/135.1 |
| 4,360,820 | 11/1982 | Forster et al. | 346/135.1 |
| 4,397,923 | 8/1983 | Yasuda et al. | 427/162 |
| 4,410,581 | 10/1983 | Nam | 428/195 |
| 4,450,452 | 5/1984 | Ando et al. | 346/135.1 |
| 4,499,178 | 2/1985 | Wada et al. | 430/495 |

*Primary Examiner*—E. A. Goldberg
*Assistant Examiner*—Gerald E. Preston
*Attorney, Agent, or Firm*—Wenderoth, Lind & Ponack

[57] ABSTRACT

An optical disc comprises a resin disc substrate, a recording medium layer formed on the disc substrate, a high purity of transparent layer, and a transparent protective resin layer. The transparency of the transparent layer is larger than that of the transparent protective resin layer. A laser beam is focused on the recording medium layer through the transparent protective layer and the transparent layer. The transparent layer is a transparent adhesive layer or an air layer. The focused laser beam is not affected by foreign matter in the vicinity of the recording medium layer due to the high transparency of the transparent layer on the recording medium layer.

20 Claims, 9 Drawing Figures

OPTICAL DISC AND METHOD OF MANUFACTURING

BACKGROUND OF THE INVENTION

1. Field of the Invention

This invention relates to an optical disc on which optically modulated video, audio and other information signals are recorded and a method of manufacturing the optical disc.

2. Description of the Prior Art

Some optical information recording and reproducing systems have recently been developed. The optical information recording and reproducing system can record video, audio and other information signals, as optically modulated signals, onto an optical recording disc (optical disc, hereafter) as shown in FIG. 1 and reproduces the recorded signals from the optical disc by using a laser beam.

Figure 1:
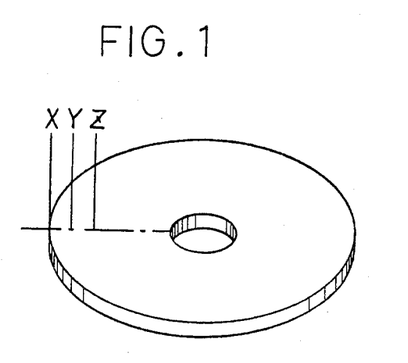
FIG. 1 is a schematic perspective view of an optical disc.
Figure 2:
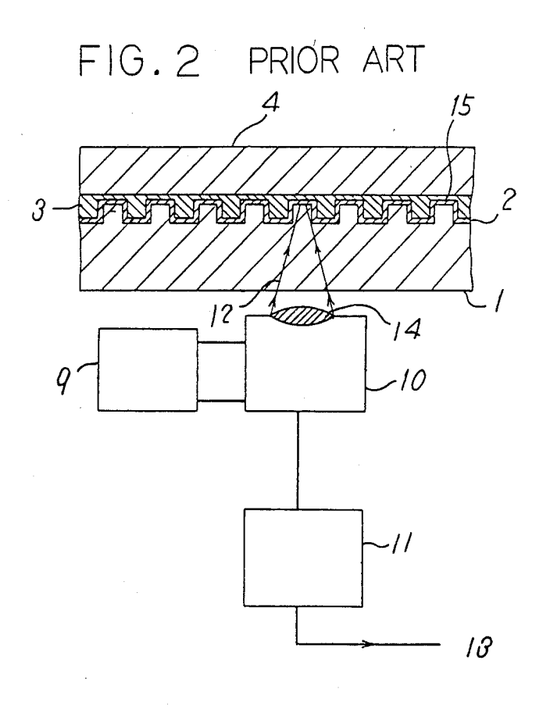
FIG. 2 is a partial sectional view, taken along the line Y-Z in FIG. 1, of a typical conventional single-side recordable optical disc, in association with a schematic block diagram of an optical signal processing system for recording and reproducing signals.

FIGS. 2 shows a partial sectional view, taken along the line Y-Z in FIG. 1, of a typical conventional single-side recordable optical disc. A disc substrate 1 is made by compression-molding or injection-molding transparent glass or resin material. A laser beam guiding groove 15 is formed on one surface of the disc substrate 1 in a spiral shape to guide the laser beam during the recording or reproducing operation. The number of turns of the spiral groove 15 is 15000-24000. This groove 15 may be omitted. A recording medium layer 2 generally made of tellurium alloy is deposited by vapor deposition, for example, on the surface provided with the spiral laser beam guiding groove 15 of the substrate 1. The optically modulated signals are recorded on this recording medium layer 2. The recording medium layer 2 is generally made of a material such as bismuth, molybdenum, tellurium, cobalt, nickel, arsenic, zinc, and tin. A protective resin layer 4 is adhered to the recording medium layer 2 with a adhering layer 3 for protecting the recording medium layer 2 from dust and the like.

Figure 3:
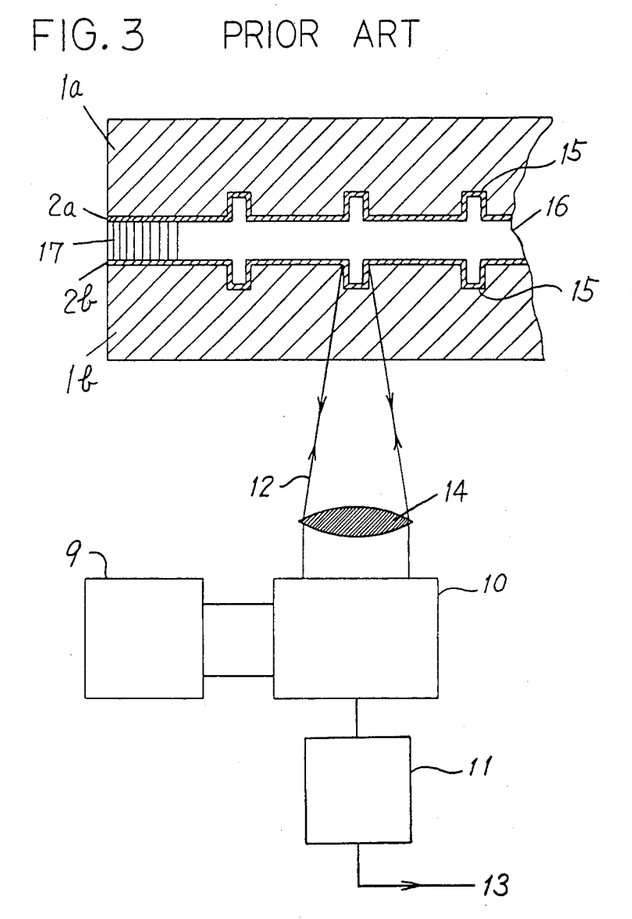
FIG. 3 is a partial sectional view, taken along the line X-Y in FIG. 1, of a typical conventional double-sides recordable optical disc, in association with a schematic block diagram of an optical signal processing system for recording and reproducing signals.

FIG. 3 shows a partial sectional view, taken along the line X-Y in FIG. 1, of a typical conventional double-sides recordable optical disc, which is the so-called air sandiwch type optical disc. Two disc substrates 1a, 1b are formed by the compression-molding or the injection-molding, each substrate having a laser beam guiding groove 15 spirally formed on one surface thereof. Recording medium layers 2a 2b are formed by such as vapor deposition on the groove-formed surfaces of the disc substrates 1a, 1b, respectively. The recording medium layers 2a, 2b are generally made of tellurium alloy. The two disc substrates with recording medium layers are fixed at the recording medium layer sides with spacer rings 17 which are provided at outer and inner peripheries of the disc, so that an air layer 16 is provided between the recording medium layers 2a, 2b.

When signals are recorded onto or reproduced from the optical discs as shown in FIGS. 2 and 3 the laser beam is incident upon the recording medium layer from the disc substrate side of the optical disc. Referring to FIG. 1 (or FIG. 2), the laser beam 12 radiated from a laser 9, when recording, is passed through an optical system 10 and converged by an objective lens 14 to focus on the recording medium layer 2 through the transparent disc substrate 1. The laser beam 12 is focused to form a small spot of about 1 μm in the diameter at the surface of the recording medium layer 2. A part of the laser beam reflected from the recording medium layer 2, when reproducing, passes the beam on same path back through the objective lens 14 and to the optical system 10, and is further lead to a photodetector 11 which converts the reflected laser beam to an electrical signal 13. In this case, in the vicinity of the surface facing to the objective lens 14 of the disc substrate 1, the laser beam which is not adequately converged there is less intercepted by foreign matter existing there. However, in the vicinity of the recording medium layer 2, the laser beam, which is adequately focused to be a small spot of about 1 μm in diameter there, is intercepted by a foreign matter of about 1 μm in size existing there. In other words, the recording or reproducing error rate (which is defined as the possibility of losing an information bit with respect to the number of recording or reproducing information bits) is largely affected by the purity of the transparent disc substrate in the vicinity of the recording medium layer.

Accordingly, the conventional optical disc requires a very high quality transparent disc substrate which contains quite a few foreign matters and is optically uniform throughout the substrate. Actually, it is very difficult to select and mold a material suitable to satisfy the above requirement.

SUMMARY OF THE INVENTION

An object of the present invention is to provide an optical disc which is highly reliable regardless of the purity and uniformity of the disc substrate.

Another object of the present invention is to provide a method of manufacturing a highly reliable optical disc.

These objects can be accomplished by the following structure of disc and manufacturing method.

An optical disc according to the present invention comprises: a resin disc substrate; a recording medium layer formed on a surface of the disc substrate for recording information; a transparent layer formed on the recording medium layer; and a transparent protective resin layer formed on the transparent layer, the transparency of the transparent layer being higher than that of the transparent protective resin layer. A laser beam is focused on a surface of the recording medium layer facing to the transparent layer through the transparent protective resin layer and the transparent layer.

This optical disc is produced by a method comprising the steps of: forming a resin disc substrate by injection-molding or pressure-molding; depositing a recording medium material on a surface of the resin disc substrate to form a recording medium layer; forming a transparent layer on the recording medium layer; and forming a transparent protective resin layer on the transparent layer.

The transparent layer may be a transparent adhesive layer or an air layer formed by providing an outer peripheral spacer ring and an inner peripheral spacer ring between the recording medium layer and the transparent protective resin layer. The thickness of the transparent adhesive layer is 50–1000 μm, and more preferably 50–200 μm. The thickness of the air layer is 10–1000 μm, and more preferably 20–1000 μm. The transparent layer is required not to contain foreign matter each having a size larger than 0.2 μm.

The transparent adhesive layer is formed by the steps of: purifying a transparent adhesive material such as a photosetting adhesive and a thermosetting adhesive; coating the purified transparent adhesive material to be a layer on the recording medium layer; putting a transparent protective resin plate on the coated purified transparent adhesive layer; and hardening the transparent adhesive layer by in radiating ultraviolet rays on the transparent adhesive layer in the case of the light-setting adhesive or heating the transparent adhesive layer in the case of the thermosetting adhesive.

The air layer is formed in a clean room by the steps of: adhering a pair of outer and inner peripheral spacer rings to the recording medium layer; and adhering a transparent protective resin plate to the pair of outer and inner peripheral spacer rings, thereby to form an air layer covered by the recording medium layer, the transparent protective resin layer, and the pair of outer and inner peripheral spacer rings.

According to the present invention, as described above, a high purity of transparent layer is provided in the vicinity of the recording medium layer. Accordingly, the adequately focused laser beam in the vicinity of the recording medium layer is less affected by foreign matter, so that the error rate is remarkably improved.

Further, if the above described construction of layers is provided on both surfaces of the disc substrate, a double-sides recordable optical disc can be obtained.

The above and other objects and features of the present invention will become apparent from the following description in association with some preferred embodiments and the accompanying drawings in which:

DESCRIPTION OF THE PREFERRED EMBODIMENTS

Figure 4:
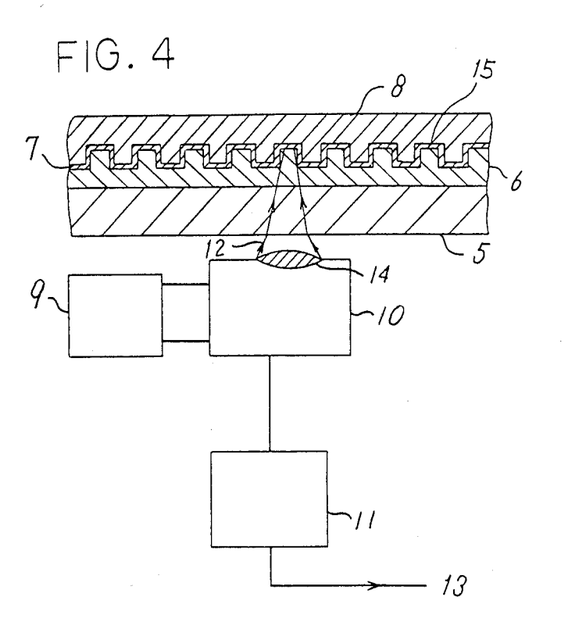
FIG. 4 is a partial sectional view, taken along the line Y-Z in FIG. 1, of an embodiment of an optical disc according to the present invention, in association with a schematic block diagram of an optical signal processing system for recording and reproducing signals.

FIG. 4 shows an embodiment of a single-side recordable optical disc of the invention and an optical system for optically recording and reproducing signals on the optical disc. A resin disc substrate 8 is formed by injection-molding or compression-molding a resin such as acrylic resin and polycarbonate resin. The resin disc substrate 8 is provided on one surface thereof with a spiral laser beam guiding groove 15 (15000–24000 turns) for guiding a laser beam along its spiral path from the inside to the outside of the disc. A recording medium layer 7 is formed by depositing a recording medium material such as tellurium oxide and organic coloring matter.

A photosetting acrylic adhesive is filtered by a 0.2 $\mu$m particle filter and the thus purified photosetting acrylic adhesive is coated on the recording medium layer 7 to be uniform in thickness to form a transparent layer 6. A transparent protective resin plate made of a resin such as acrylic resin and polycarbonate resin is put on the transparent adhesive layer 6 to be a transparent protective resin layer 5. Then ultraviolet rays are incidented on the transparent adhesive layer 6 through the transparent protective resin 5 to harden the transparent adhesive layer 6 thereby to firmly adhere the recording medium layer 7 to one surface of the transparent layer 6 and the transparent protective resin layer 5 to the other surface of the transparent layer 6. In this way the optical disc comprising the four layers—the resin disc substrate 8, the recording medium layer 7, the high purity of transparent layer 6, and the transparent protective resin layer 5—is produced. It is needless to say that the disc substrate 8 may not be provided with the laser beam guiding groove 15.

The laser beam is incident from the optical signal processing system upon the recording medium layer 7 through the transparent protective resin layer 5 and the transparent layer 6. A part of the laser beam reflected by the recording medium layer 5 returns along the same path as that of the incidented beam to the optical signal processing system. The construction and the operation of the optical signal processing system is the same as those of the conventional example. During the signal reproducing mode, for example, the laser beam radiated from the laser 9 is guided by the optical system 10 to the objective lens 14. The objective lens 14 focuses the laser beam on the surface of the recording medium layer 7 to be a small spot of about 1 $\mu$m in diameter. A part of the laser beam is reflected from the surface of the recording medium layer 7 and returned to the objective lens 14 and further to the photodetector 11 through the optical system 10. The optical detector 11 converts the reflected laser beam to an electric signal 13. More concrete information concerning and operation of the optical signal processing system is well-known and it is therefore unnecessary to describe here.

The error rate of the optical disc shown in FIG. 4 having the transparent adhesive layer 6 of 200 $\mu$m in thickness is $8 \times 10^{-6}$ when the transparent protective resin layer 5 is made of acrylic resin and $3 \times 10^{-5}$ when the transparent protective resin layer 5 is made of polycarbonate resin. This value of the error rate is considerably small compared with that of the conventional optical disc. As a comparison, the error rate of the conventional optical disc shown in FIG. 2 is $3 \times 10^{-4}$ when the acrylic resin disc substrate is used and $8 \times 10^{-4}$ when the polycarbonate resin disc substrate is used.

This small error rate is obtained because of the high purity of the transparent adhesive layer 6 provided in the vicinity of the recording medium layer 7. The transparent adhesive material is filtered by the 0.2 $\mu$m particle filter so as not to contain any foreign matter having the size large enough to intercept the adequately focused (about 1 μm in diameter) laser beam.

Figure 5:
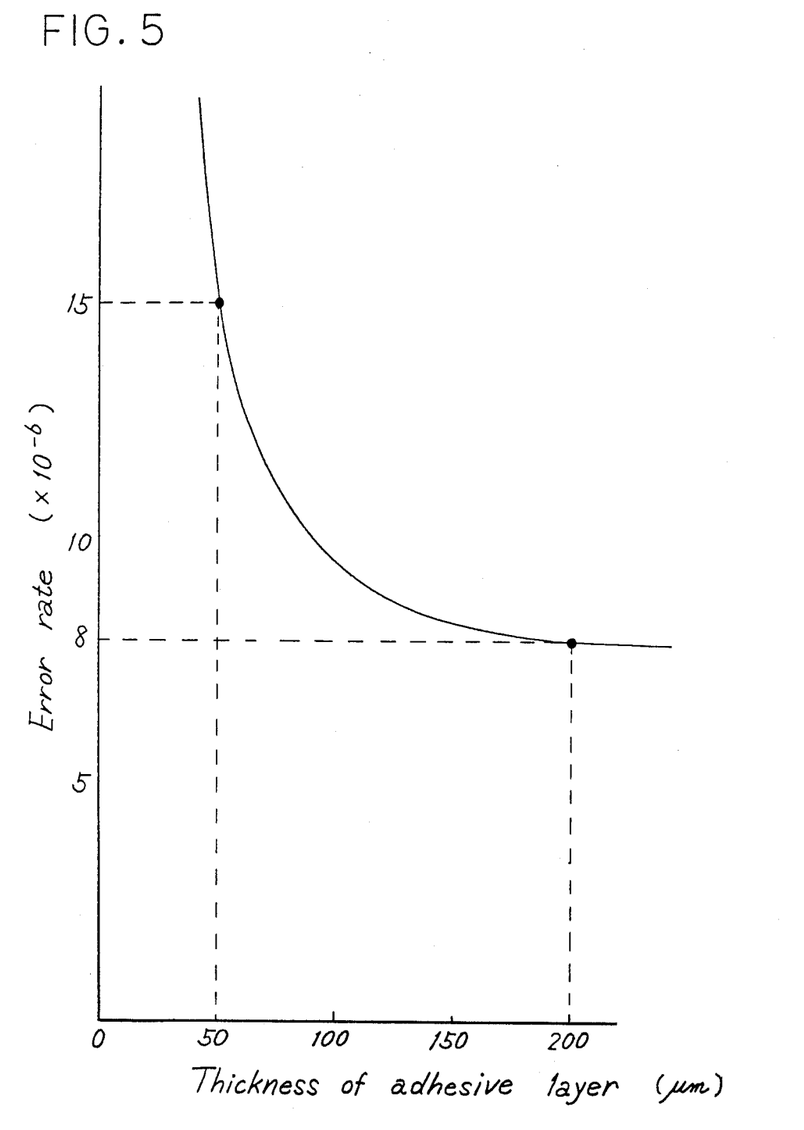
FIG. 5 is a graph showing a relationship between the thickness of a transparent adhesive layer and the error rate.

The relationship between the error rate of the optical disc and the thickness of the transparent adhesive layer 6 of FIG. 4 is shown in FIG. 5. Referring to FIG. 5, the error rate is $15 \times 10^{-6}$ when the thickness of the transparent adhesive layer 6 is 50 μm and $8 \times 10^{-6}$ when the thickness is 200 μm. When the thickness of the layer 6 is smaller than 50 μm the error rate increases rapidly, and when the thickness of the layer 6 is larger than 200 μm the error rate does not change further. Considering the whole dimension of the disc, the thickness of the layer 6 should be at most 1000 μm. On the other hand, since it is difficult to make uniform the thickness of the transparent adhesive layer 6 when the thickness is large. The uniformity in thickness of the layer 6 is important for allowing the laser beam to accurately focus on any part of the surface of the recording medium layer 7. Accordingly, the thickness of the transparent adhesive layer 6 is preferably 50–200 μm.

In the above embodiment the transparent layer 6 is made of the photosetting acrylic adhesive, but it may be made of the other photosetting adhesives. Also, the transparent layer 6 may be made of a thermosetting adhesives which are hardened by heating. Moreover, the transparent layer 6 may be the air layer.

Figure 6:
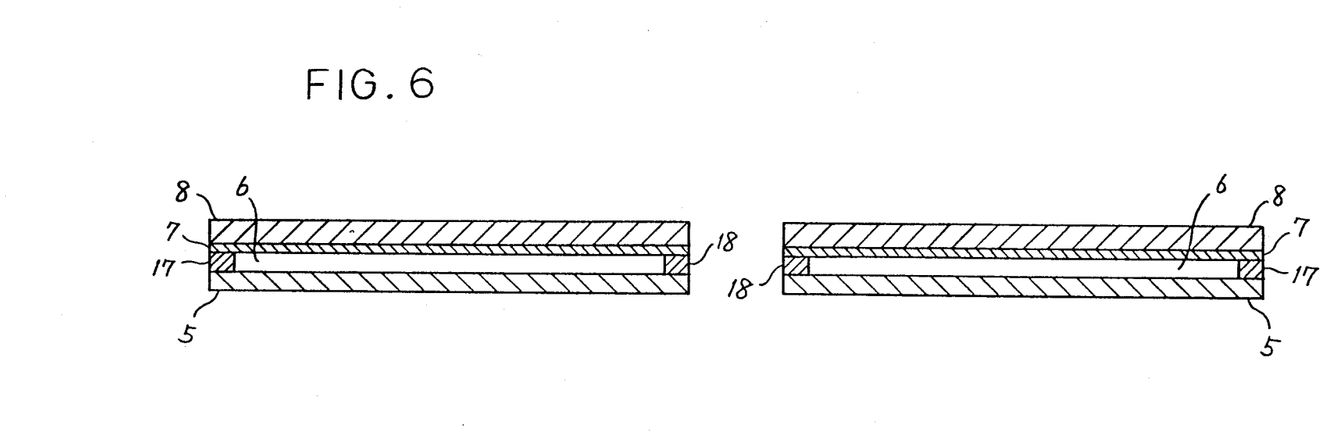
FIG. 6 is a sectional view, taken along the diameter, of another embodiment of an optical disc according to the present invention.

FIG. 6 shows a sectional view taken along the diameter of another embodiment of the optical disc of the invention, in which the air layer is used as the transparent layer 6. The air layer is formed by providing an outer peripheral spacer ring 17 and an inner peripheral spacer ring 18 between the recording medium layer 7 and the transparent protective resin layer 5. This pair of outer and inner peripheral spacer rings 17, 18 are fixed to the recording medium layer 7 and the transparent protective resin layer 5 with an adhesive so as to isolate the air layer 6 from the external atmosphere. The fabrication of the pair of spacer rings 17, 18 must be performed in a clean air atmosphere which does not contain any dust larger than 0.2 μm in size to assure that the formed air layer 6 is adequately transparent with respect to the focused laser beam of about 1 μm in diameter. The further details of the air layer will be described later.

Figure 7:
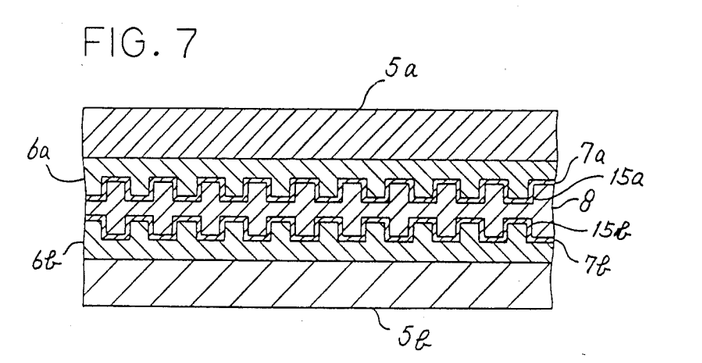
FIG. 7 is a partial sectional view, taken along the line Y-Z in FIG. 1, of still another embodiment of an optical disc according to the present invention.

FIG. 7 shows a sectional view, taken along the line Y-Z in FIG. 1, of an embodiment of a double-sides recordable optical disc according to the present invention. A resin disc substrate 8 is provided on both surfaces thereof spiral laser beam guiding grooves 15a, 15b, respectively. The laser beam guiding grooves 15a, 15b may be omitted. Recording medium layers 7a, 7b are formed on both surfaces of the resin disc substrate 8, respectively. Transparent adhesive layers 6a, 6b are formed on the recording medium layers 7a, 7b, respectively. Transparent protective resin layers 5a, 5b are formed on the transparent adhesive layers 6a, 6b, respectively. The materials and methods of forming these substrate and layers are the same as those described before in connection with the embodiment of FIG. 4.

Figure 8:
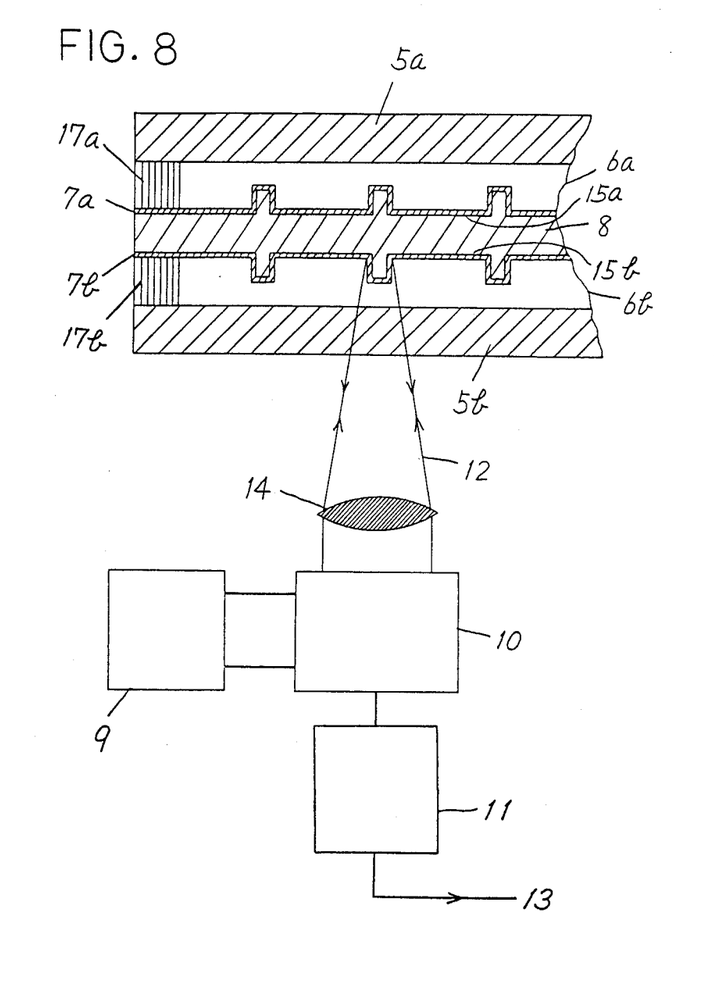
FIG. 8 is a partial sectional view, taken along the line X-Y in FIG. 1, of a further embodiment of an optical disc according to the present invention, in association with a schematic block diagram of an optical signal processing system for recording and reproducing signals.

FIG. 8 shows a sectional view, taken along the line X-Y in FIG. 1, of another embodiment of a double-sided recordable optical disc according to the present invention. This embodiment is different from the embodiment of FIG. 7 in that air layers are used as the transparent layers 6a, 6b. The air layers 6a, 6b are formed by providing outer peripheral spacer rings 17a, 17b and inner peripheral spacer rings (not shown in FIG. 8 but correspond to the inner peripheral spacer ring 18 shown in FIG. 6) between the recording medium layers 7a, 7b and the transparent protective resin layers 5a, 5b, respectively. FIG. 8 also shows the optical signal processing system, but the description thereof will be omitted since it is completely the same as that described before in connection with the embodiment of FIG. 4 and the conventional example.

Figure 9:
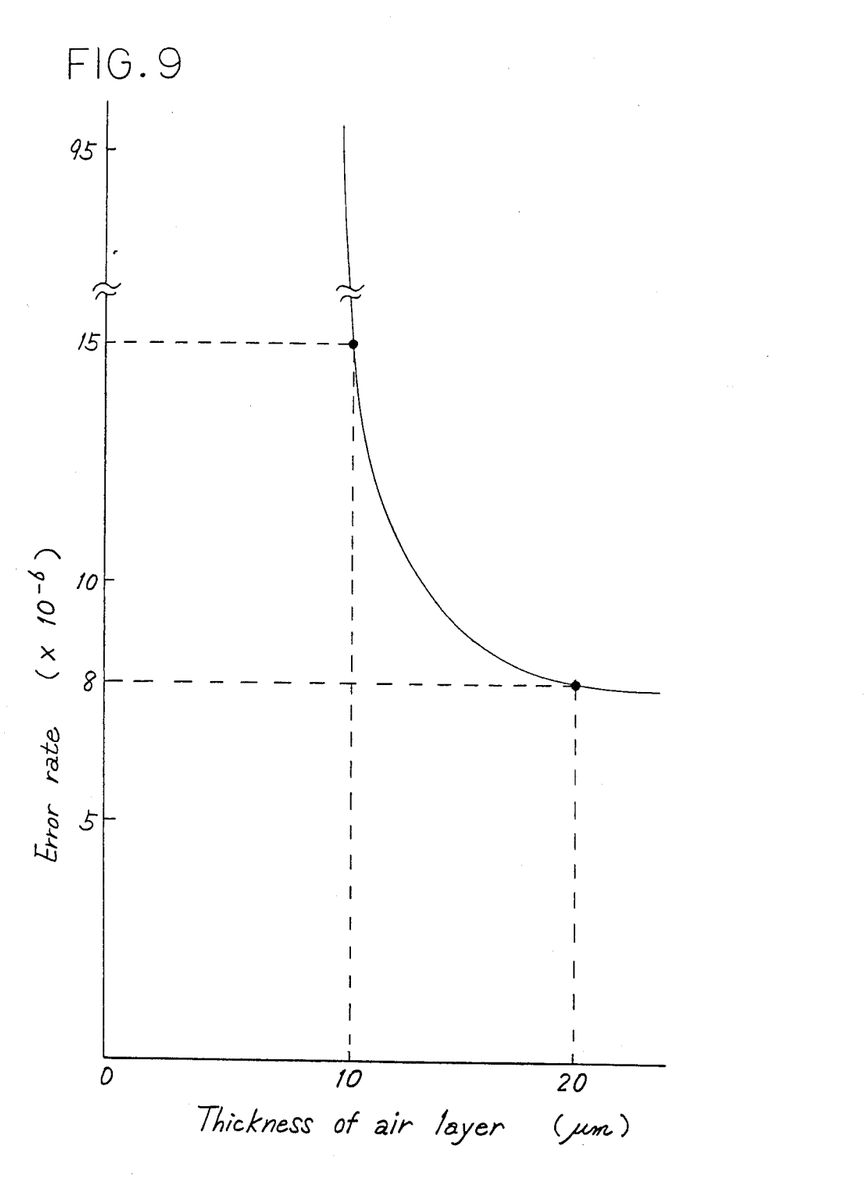
FIG. 9 is a graph showing a relationship between the thickness of a transparent air layer and the error rate.

FIG. 9 shows the relationship between the error rate of the optical disc and the thickness of the air layer 6a or 6b of FIG. 8. Referring to FIG. 9, the error rate is $15 \times 10^{-6}$ when the thickness of the air layer is 10 μm and $8 \times 10^{-6}$ when the thickness of the air layer is 20 μm. This value of the error rate is considerably small compared with that of the conventional optical disc. As a comparison, the error rate of the conventional optical disc shown in FIG. 3 is $3 \times 10^{-4}$. When the thickness of the air layer is smaller than 10 μm the error rate increases very rapidly. This increasing rate of the error rate is much larger than that using the transparent adhesive layer as the transparent layer shown in FIG. 5. When the thickness of the air layer is larger than 10 μm the error rate does not change further. Considering the entire size of the optical disc, the thickness of each of the air layers 6a, 6b is preferably 20–1000 μm.

As apparent from the foregoing description, the disc substrate 8 may not be transparent while the disc substrate 1 of the conventional optical disc must be transparent. The disc substrate 8 may be made of black resin to absorb much amount of optical energy and thermal energy of the laser beam. Accordingly, the crystal phase transfer and evaporation of the recording medium layer by the incident laser beam are accelerated, so that the S/N ratio of the optical disc is improved.

Although several embodiments are described hereabove they are only some explanatory examples for allowing the present invention to be understood, but they are not for limiting the scope of the present invention. Therefore it should be understood that various changes and modifications can be made without departing from the scope of the present invention, which is defined in the appended claims.

What is claimed is:

1. An optical disc comprising:
   a resin disc substrate;
   a recording medium layer formed on at least one surface of said disc substrate for recording thereon signals by a laser beam;
   a transparent layer formed on said recording medium layer; and
   a transparent protective resin layer formed on said transparent layer for protecting said transparent layer,
   the transparency of said transparent layer being higher than that of said transparent protective resin layer so that said laser beam focused on said recording medium layer is not intercepted in said transparent layer.

2. The optical disc according to claim 1, wherein said transparent layer is a transparent adhesive layer.

3. The optical disc according to claim 2, wherein said transparent adhesive layer does not contain any foreign matter larger than 0.2 μm.

4. The optical disc according to claim 2, wherein the thickness of said transparent adhesive layer is 50–1000 μm.

5. The optical disc according to claim 2, wherein said transparent adhesive layer is made of photosetting acrylic adhesive.

6. The optical disc according to claim 1, wherein said transparent layer is an air layer formed by providing an outer peripheral spacer ring and an inner peripheral spacer ring between said recording medium layer and said transparent protective resin layer.

7. The optical disc according to claim 6, wherein said air layer does not contain any foreign matter larger than 0.2 $\mu$m.

8. The optical disc according to claim 6, wherein the thickness of said air layer is 10–1000 $\mu$m.

9. The optical disc according to claim 1, wherein said resin disc substrate is made of acrylic resin or polycarbonate resin.

10. The optical disc according to claim 1, wherein said recording medium layer comprises tellurium oxide or organic coloring matter.

11. The optical disc according to claim 1, wherein said transparent protective resin layer is made of acrylic resin or polycarbonate resin.

12. An optical disc comprising:
a resin disc substrate;
a recording medium layer formed on at least one surface of said disc substrate for recording thereon signals by a laser beam;
a transparent layer formed on said recording medium layer and containing no foreign matter larger than 0.2 $\mu$m; and
a transparent protective acrylic resin layer formed on said transparent layer for protecting said transparent layer,
the transparency of said transparent layer being higher than that of said transparent protective acrylic resin layer so that said laser beam focused on said recording medium layer is not intercepted in said transparent layer.

13. The optical disc according to claim 12, wherein said transparent layer is a transparent acrylic adhesive layer.

14. The optical disc according to claim 13, wherein the thickness of said transparent acrylic adhesive layer is 50–1000 $\mu$m.

15. The optical disc according to claim 12, wherein said transparent layer is an air layer formed by providing an outer peripheral spacer ring and an inner peripheral spacer ring between said recording medium layer and said transparent protective acrylic resin layer.

16. The optical disc according to claim 15, wherein the thickness of said air layer is 10–1000 $\mu$m.

17. A method of manufacturing an optical disc comprising the steps of:
forming a resin disc substrate by injection-molding or compression-molding;
vapor-depositing a recording medium material on at least one surface of said resin disc substrate to form a recording medium layer;
forming a transparent layer on said recording medium layer; and
forming a transparent protective resin layer on said 18. A method of manufacturing an optical disc comprising the steps of:
forming a resin disc substrate by injection-molding or compression-molding;
vapor-depositing a recording medium material on at least one surface of said resin disc substrate to form a recording medium layer;
forming a transparent layer on said recording medium layer; and
forming a transparent protective resin layer on said transparent layer, and
wherein the step of forming said transparent layer and said transparent protective resin layer comprises the steps of: purifying a transparent adhesive by filtration: coating the purified transparent adhesive on said recording medium layer; putting a transparent protective resin plate on the coated transparent adhesive; and hardening the coated transparent adhesive by irradiating with ultraviolet rays or heating.

19. The method according to claim 18, wherein said filter is a 0.2 $\mu$m particle filter.

20. A method of manufacturing an optical disc comprising the steps of:
forming a resin disc substrate by injection-molding or compression-molding;
vapor-depositing a recording medium material on at least one surface of said resin disc substrate to form a recording medium layer;
forming a transparent layer on said recording medium layer; and
forming a transparent protective resin layer on said transparent layer, and
wherein the step of forming said transparent layer and said transparent protective resin layer comprises the steps, in a clean atmosphere, of: adhering a pair of outer and inner peripheral spacer rings to said recording medium layer; and adhering a transparent protective resin plate to said pair of spacer rings, thereby forming an air layer as said transparent layer covered by said recording medium layer, said transparent protective resin plate as said transparent protective resin layer, and said pair of spacer rings.

* * * * *